United States Patent
Dahlquist et al.

(10) Patent No.: US 7,213,174 B2
(45) Date of Patent: May 1, 2007

(54) PROVISION OF PROCESS RELATED INFORMATION

(75) Inventors: Erik Dahlquist, Västerås (SE); Galia Weidl, Steinenbronn (DE)

(73) Assignee: ABB AB, Västerås (SE)

( * ) Notice: Subject to any disclaimer, the term of this patent is extended or adjusted under 35 U.S.C. 154(b) by 205 days.

(21) Appl. No.: 10/479,664

(22) PCT Filed: Jun. 5, 2002

(86) PCT No.: PCT/EP02/06170

§ 371 (c)(1),
(2), (4) Date: May 28, 2004

(87) PCT Pub. No.: WO02/099550

PCT Pub. Date: Dec. 12, 2002

(65) Prior Publication Data

US 2004/0250166 A1     Dec. 9, 2004

(30) Foreign Application Priority Data

Jun. 5, 2001 (GB) .................................. 0113659

(51) Int. Cl.
G06F 11/00    (2006.01)
(52) U.S. Cl. .......................................... 714/37; 714/38
(58) Field of Classification Search ............... 714/37, 714/38
See application file for complete search history.

(56) References Cited

U.S. PATENT DOCUMENTS

| 4,755,925 A | | 7/1988 | Tsuchiya et al. | |
| 5,127,005 A | * | 6/1992 | Oda et al. | 714/26 |
| 5,161,158 A | * | 11/1992 | Chakravarty et al. | 714/26 |
| 5,210,704 A | * | 5/1993 | Husseiny | 702/34 |
| 5,729,452 A | | 3/1998 | Smith et al. | |
| 5,864,662 A | * | 1/1999 | Brownmiller et al. | 714/43 |
| 6,560,585 B1 | | 5/2003 | Le Goc et al. | |
| 6,704,888 B1 | * | 3/2004 | Caudrelier et al. | 714/37 |

(Continued)

FOREIGN PATENT DOCUMENTS

EP    0364151 A2    4/1990

(Continued)

OTHER PUBLICATIONS

Timothy A. Mast, et al.; "Bayesian Belief Networks for Fault Identification in Aircraft Gas Turbine Engines", Control Applications, 1999. Proceedings of the 1999 IEEE International Conference on Kohala Coast, HI, USA Aug. 22-27, 1999; Aug. 22, 1999; pp. 39-44; Piscataway, New Jersey.

(Continued)

Primary Examiner—Scott Baderman
Assistant Examiner—Brian Assessor
(74) Attorney, Agent, or Firm—Venable LLP; Eric J. Franklin (57) ABSTRACT

A method and an analyzer for producing information associated with a process is disclosed. Information from information sources that associate with the process is processed to classify the information into characteristic states. Results of the classification are then analyzed for producing information associated with at least one root cause for an event by means of at least one analyzing technology that is capable of reasoning under at least one uncertainty.

53 Claims, 7 Drawing Sheets

U.S. PATENT DOCUMENTS

| | | | |
|---|---|---|---|
| 6,795,935 B1* | 9/2004 | Unkle et al. | 714/37 |
| 6,947,797 B2* | 9/2005 | Dean et al. | 700/79 |
| 6,988,011 B2* | 1/2006 | Varma et al. | 700/79 |
| 2002/0166082 A1* | 11/2002 | Ramadei et al. | 714/37 |
| 2004/0078683 A1* | 4/2004 | Buia et al. | 714/37 |

FOREIGN PATENT DOCUMENTS

| | | |
|---|---|---|
| EP | 0557628 A1 | 9/1993 |
| EP | 0908805 A1 | 4/1999 |
| EP | 1069486 A1 | 1/2001 |
| GB | 2347234 A | 8/2000 |
| WO | WO 92/14207 A1 | 8/1992 |
| WO | WO 01/31411 A1 | 5/2001 |
| WO | WO 2006056721 A1 * | 6/2006 |

OTHER PUBLICATIONS

V. M. Frank, D.C. Bley, S.A. Epstein and B.J. Garrick; "Expert Systems for Diagnosing the Root Case of Failures"; Database Accession No. 3207084 XP002187138; Jun. 1988; pp. 460-461; Transactions of the American Nuclear Society; San Diego, CA, USA.

J. Montmain and S. Gentil; "Decision Processes in Detection and Diagnosis of Malfunctions"; Database Accession No. 4559680; Nov. 1992; pp. 99-106; Nanterre Cedex, France, EC2 France.

* cited by examiner

PROVISION OF PROCESS RELATED INFORMATION

CROSS-REFERENCE TO RELATED APPLICATIONS

This application claims priority to British patent application 0113659.7 filed 5 Jun. 2001 and is the national phase under 35 U.S.C. § 371 of PCT/EP02/06170.

FIELD OF THE INVENTION

The present invention relates to provision of information associated with a process, and in particular, but not exclusively, to producing information associated with at least one possible root cause for an event.

BACKGROUND OF THE INVENTION

Various types of industries employ different processes such as continuous, discrete, batch like processes and so on. An industrial process may be of substantially large and/or complex nature. Examples of the processes include, without limiting to these, processes for chemical plants, oil refineries, pharmaceutical or petrochemical industries, food and beverage industries, pulp and paper mills, power plants, steel mills, metals and foundry plants, automated factories and so on.

A process may need to be analysed for various reasons. The results of the analysis may be used e.g. as a support in the control of the process, for producing information that is needed later on e.g. when processing the end product of the process, for diagnostic of events such as a fault or abnormality diagnostic and so on. It is also possible to diagnostic complex products or their parts and/or optimise assets by means of process analysis.

The term 'event' shall be understood to refer to any abnormality or failure/fault or any other deviation from normal operation conditions of the process.

A process can be analysed based on input information that has been gathered from various sources associated with the process. The input information may be associated, for example, with various stages of a continuous process, product or asset to be controlled and/or various elements of the processing apparatus and so on. Various alarm and signal information may be used as input information in a process analysis. The available alarm and signal information may be collected from a number of sources such as from different diagnostics packages, a maintenance system, from equipment data and/or knowledge database, various sensors, soft sensors or meters and so on. The input information may also include information which is not obtained directly from the process, such as information regarding the environment in which the process is run. For example, the input information may be associated with the climate conditions surrounding the process, time and so on. The analysing function shall thus be able to analyse different types of information provided by different information sources.

The provision of the input information may be periodic or continuous, depending on the application. The information can be collected automatically or manually. For example, at least a part of the information may be produced and/or fed in manually by a human operator.

Analysis of an industrial process typically includes uncertainties. A reason for this is that the process conditions may vary in time. The process may also experience unexpected events. A process may also pass different transitions between different stages. Although the conditions may be stable in each of the stage, the transitions may introduce changes and variations in the process flow. These variations may be within acceptable limits and thus are not necessarily symptoms of any failures or abnormalities. However, in some instances these changes and/or variations could indeed be caused e.g. by a failure in a part of the process. The uncertainties may exist both in domain knowledge and quantitative information base of the process.

A process diagnostics system should be able to produce substantially accurate information despite the uncertainties. Therefore an industrial process diagnostic system and/or control system is needed that is capable of efficiently handling these uncertainties. More particularly, since the knowledge data and other data may incorporate uncertainties the analysis should be able to deal effectively with probabilities and uncertainties in order to provide appropriate decision support tool for the process operator.

Not all alarm signals produces by alarm information sources associated with the process are necessarily true alarms. Therefore the diagnostic system should also be capable of distinguishing between true and false alarms.

In prior art arrangements the fault indications e.g. in a process plant are connected to an alarm list function or similar record function that is then presented to an operator. For example, a list comprising different types of alarms such as the so called effect alarms and root cause alarms may be presented to the operator. Purely statistical methods such as variance and standard distribution and so on have been used to generate simple fault/no fault information.

The operator may thus be provided with a substantial amount of unprocessed information in a form of a list. The operator may need to trace the real root cause of the problem presented by means of the alarms on the list. The operator may need to perform this in a substantially short period of time. However, the operator may not be able to handle this information properly in the time that is available for him to take a control action after the information has been brought into his attention. The operator may not have any tools for selecting the most probable alarms and for effectively determining the real root cause for the problem.

The inventors have recognised that no proper solution that could take the uncertainties into account has been proposed. The inventors have also found that a more advanced decision support tool could be provided if it could be possible to input information such as different alarm signals for an analyzing function. It might also in some situations be advantageous if the produces decision support information could be ranked based on the probability of causes and/or probability of suitable control actions. Integration of the results of the analysis with the maintenance system and equipment data might also be advantageous in some applications. The integration with the maintenance system and equipment data could be used, for example, for providing an operator with a connection to asset optimisation and prediction of optimal timing e.g. for replacement or repair of a component associated with the process.

SUMMARY OF THE INVENTION

Embodiments of the present invention aim to address one or several of the above problems.

According to one aspect of the present invention, there is provided a method of producing information associated with a process, the method comprising: processing information from information sources that associate with the process to classify said information into characteristic states; and analysing the results of said classification for producing information associated with a root cause for an event by means of at least one analysing technology that is capable of reasoning under at least one uncertainty.

According to another aspect of the present invention there is provided an analyser for analysing a process, the analyser comprising processing means for classifying information associated with the process into characteristic states and analyser means for producing information associated with a root cause of an event by analysing information from the processing means, the analyser means being capable of reasoning under at least one uncertainty.

According to another aspect of the present invention a process control system is provided that comprises an analyser as stated above. A computer program product is also provided comprising program code means for performing any of steps stated above when the program is run on a computer.

A user interface is also provided, the interface comprising display means for displaying at least one root cause for an event in a process, said at least one root cause being estimated by the above described manner. A data transmission signal for transmission of data associated with a process is also provided, the data transmission signals including data associated with at least one root cause for an event in the process, said data being estimated as described above.

More specific form of the invention are defined by the dependent claims.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
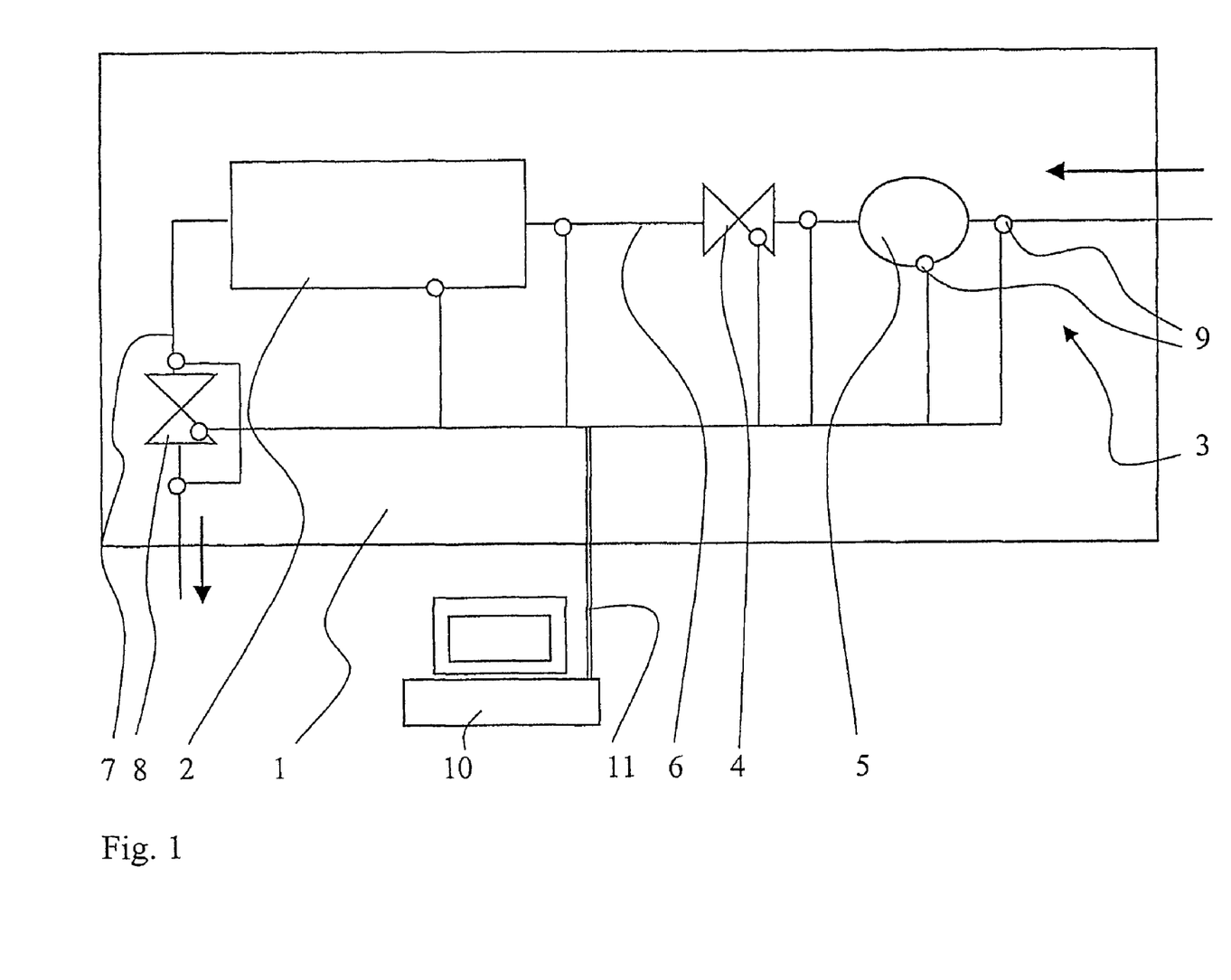
FIG. 1 is an example of process equipment that may be analysed by means of an embodiment of the present invention.

Reference is first made to FIG. 1 which is a schematic presentation of equipment for a continuous process comprising various stages. The process is analysed by means of a computerised control function. The control function is adapted to collect information from various sources provided in association with the process. Information may also be input manually into the control system, if necessary. For example, an operator may input information such as an acknowledgement that a failure has been fixed, and/or feedback on what was the cause of the failure, what actions was required to fix it, and so on. The manual input may be accomplished by means of a standardised user interface such as a user menu with a search function or a list with check boxes.

The various elements of the exemplifying process equipment are shown to be located in a plant 1. The system is adapted for processing fluid, for example pulp or chemical liquid, steam and so on flowing continuously through the process equipment. The inlet side 3 of the system comprises inlet piping 6, an inlet valve 4 and a pump 5. A processing entity 2 such as a cooker, mixer or similar is shown to be connected to the inlet system 3. The processed material is then led out from the processing entity 2 via an outlet system 7 comprising components such as an outlet valve 8 and so on.

A data processor entity 10 is adapted to analyse the process. Appropriate data processing means as such are known by the skilled person and will thus not be explained in detail. It is sufficient to note that the data processing may be implemented by means of a computer adapted to accomplish the required process diagnostic functions. The data processor entity may comprise input and output means, processor units, such as a central processing unit (CPU) and memory means, such as ROM and RAM. All these features are also known by the skilled person, and will thus not be explained in more detail.

Figure 3:
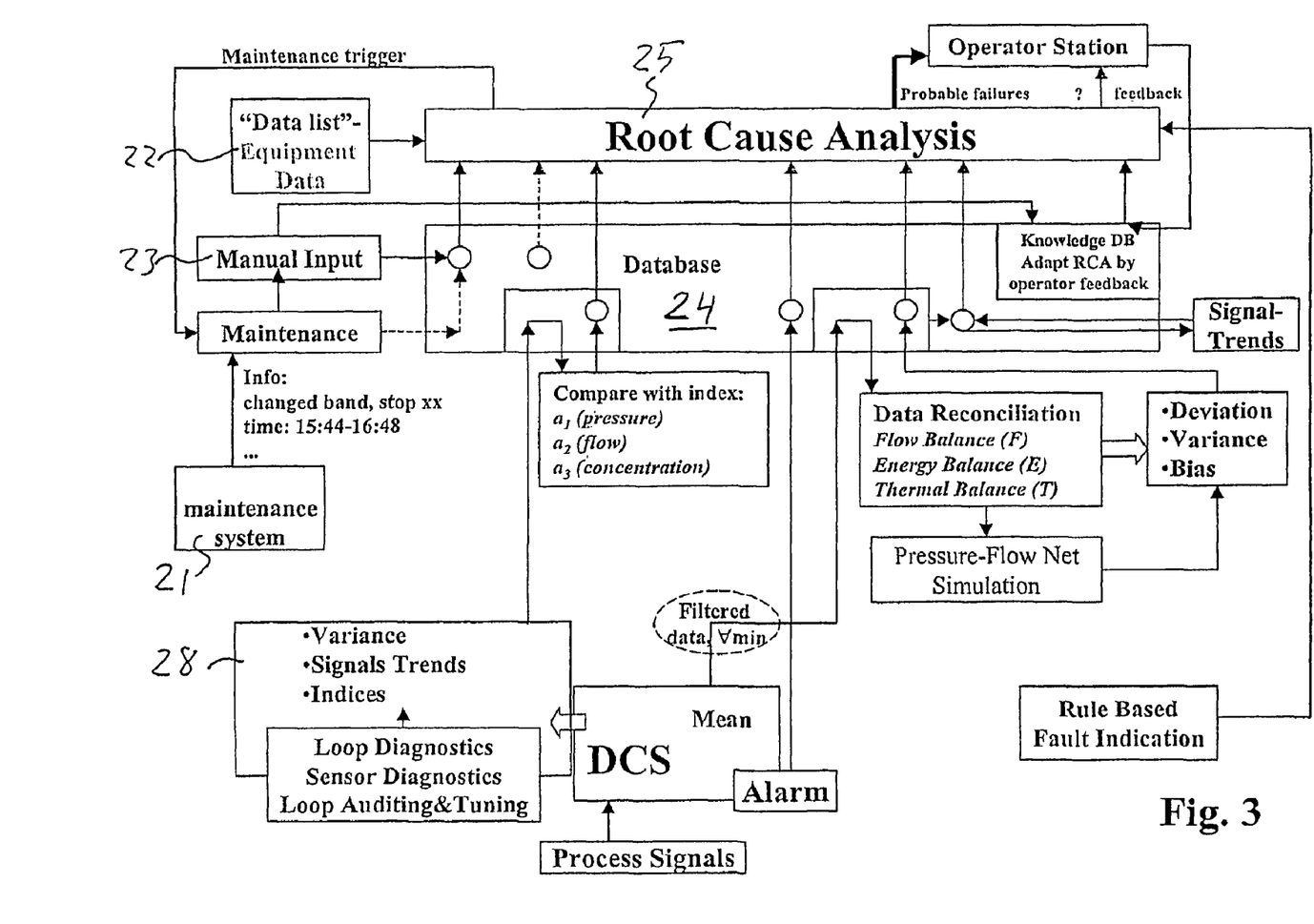
FIG. 3 is a diagram illustrating signal and alarm information that is available for analysis by a control system.
Figure 4:
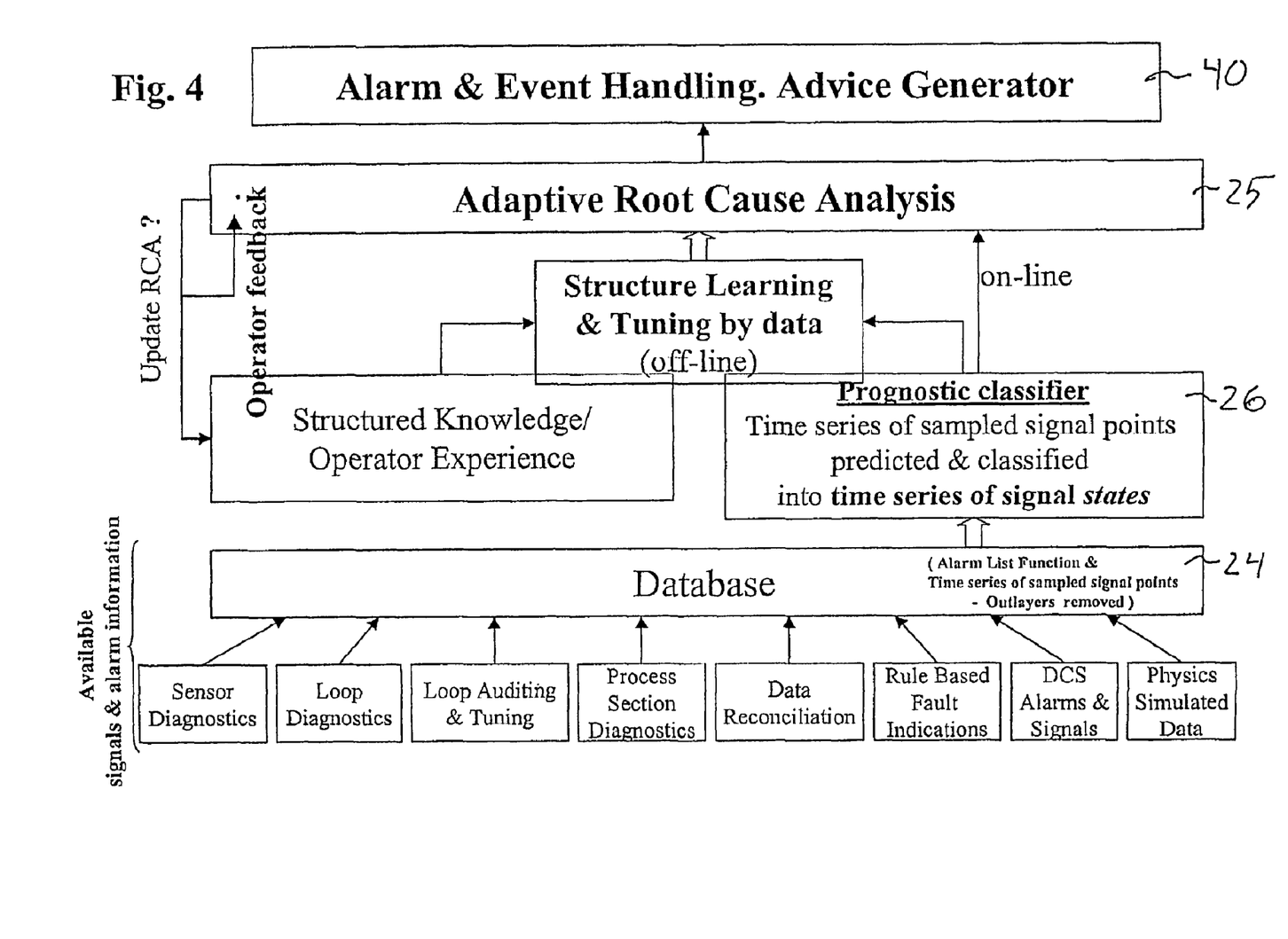
FIG. 4 is a diagram illustrating integration of information provided by a plurality of information sources.

A data connection 11, such as a bus, is shown to be provided between the data processor entity 10 and various information provision entities 9 provided in association with the process. The information provision entities 9 may comprise various sensors or soft sensors or metering devices providing numerical or other information regarding various stages and components of the process. The information may comprise, for example, numeric values for variables such as temperature, pressure, flow rate, moisture, chemical contents, operational speed of a component of the system or any other information that may be useful when analysing the operation of the process. FIGS. 3 and 4 illustrate more detailed examples of information that may be input into the analyser function.

The inventors have found that it is possible to handle uncertainties associated with a process more efficiently by means of an appropriate processing of the information before it is analysed. Probabilistic methods may be used for handling statistically the probabilities and chains of causes leading e.g. to a certain failure. The processing is such that different information signals can be input into the layer that handles the actual analysing function. The analysing function is then be accomplished by utilising at least one analysing technique that is capable of analysing input information in a reasoned manner while taking account at least one uncertainty that associates with the process to be analysed. This specification uses phrase 'reasoning under uncertainties' to refer such capability.

Figure 2:
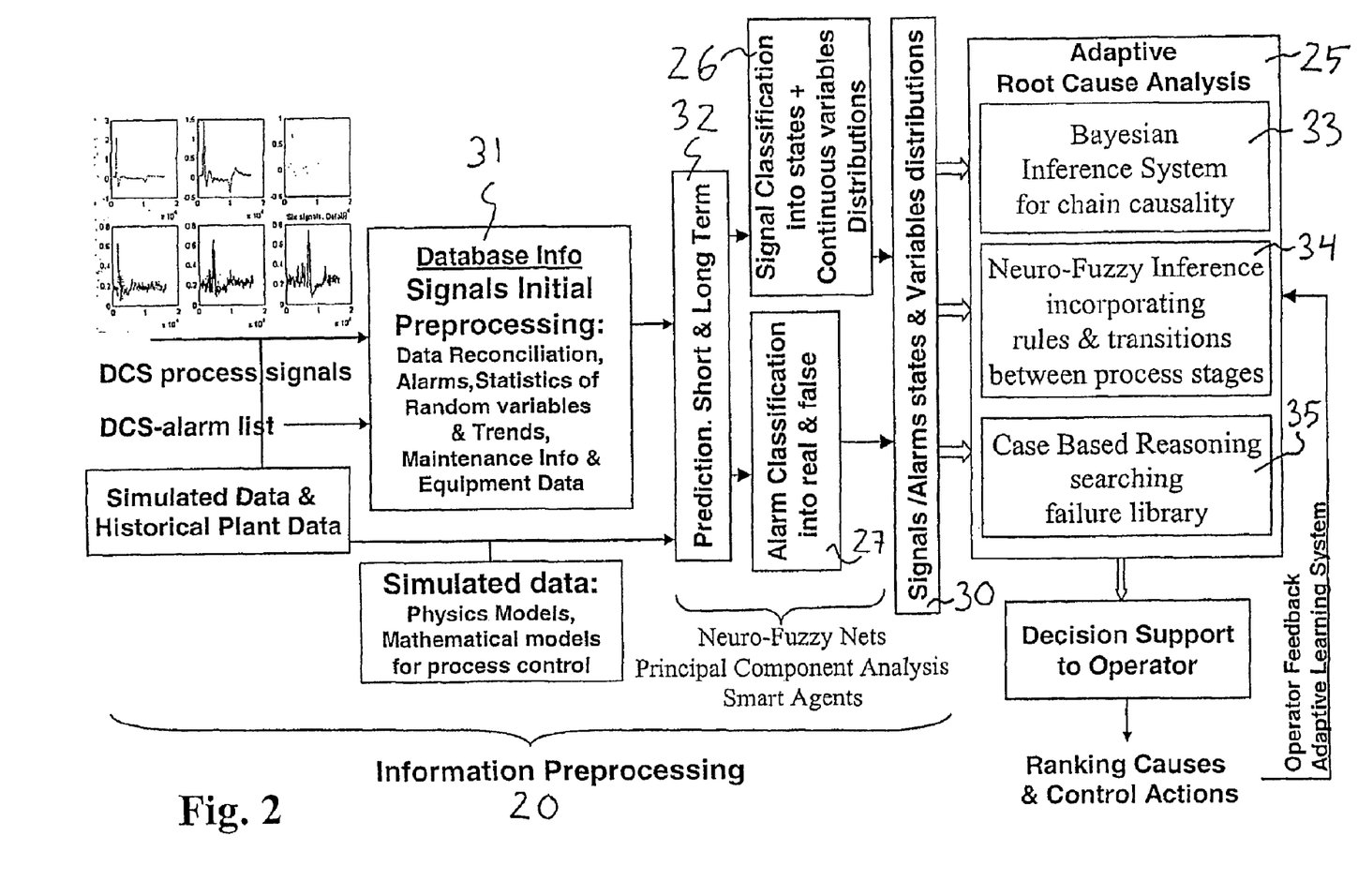
FIG. 2 is a diagram illustrating two main stages of a diagnostic scheme embodying the present invention.

FIG. 2 illustrates an embodiment wherein the reasoning under uncertainties of preprocessed information is accomplished by adaptive root cause analysis (RCA) in block 25. As proposed by its name the root cause analysis can be used in determining the root causes of problems. Removal of the root cause should also remove the origin of the problem behind an observed effect or failure. The skilled person is familiar with the basic principles of the root cause analysis. The root cause analysis may be used e.g. in a maintenance troubleshooting for anticipation and regulation of systemic causes of maintenance problems. Possible root cause analysis methods are described in more detail later on in this description.

The preprocessing stage 20 is for processing the input signals in order to facilitate the reasoning under uncertainties in the block 25. The alarms and signals information may be collected from various sources such as from diagnostics packages 28 within a control platform, a maintenance system 21, equipment data and knowledge database 22, manual input 23 and so on (see FIGS. 3 and 4). It shall be appreciated that in addition to signals indicative of a root cause the input signal also be e.g. an effect alarm. The effect alarm is an alarm that indicates a result of a root cause. An example of an effect alarm is a signal for an alarm indicative of a too high pressure, the too high pressure being caused by a root cause (e.g. a blockage somewhere in the system).

The available preprocessed signal information may be connected to input states 30 for the root cause analysis block 25. By means of the preprocessing stage 20 it is possible to process a substantial variety of information by the analysis function 25. This may be advantageous in some applications since the selected analysis function may have only limited capabilities for processing information from a plurality of sources and comprising a plurality of variables under uncertain conditions.

The Information/Signal preprocessing stage 20 is shown to consist of three steps: initial preprocessing of the signals 31, prediction 32 and classification 26, 27. However, it shall be appreciated that although FIG. 2 shows various preprocessing stages, only classification is necessarily required for enabling reasoning under uncertainties in process operation conditions. The inventors have found that by classifying the information a reduced number of variable states can be provided for input in the root cause analysis 25.

More particularly, in the classification stage alarm and signal information and other possible information may be classified into different states in block 26. The inventors have found that instead of presenting a measured or simulated value at each sampling time point of the process development (e.g. an exact temperature or pressure value) an information signal can be represented by means of a characteristic state thereof. The range of possible different values that may be input into the analyzer block can be substantially reduced by defining an appropriate number of classes into which all different signals are classified. The number of classes may be substantially low compared to the number of possible variables the information sources may provide.

For example, classes may be used to describe the value of a process parameter in the analysis. A mapping tool may be used for classification of a signal into the characteristic states (i.e. the classes). The classification can be done e.g. into classes such as normal, high, and low. For example, temperature information may be classified into three classes such that information signals indicative of temperatures below 20° C. are classified into category low. Signals indicative of temperatures between 20° C. and 50° C. are classified into category normal. Signals indicative of temperatures over 50° C. are classified into category high.

Alternatively or in addition to the above type classification based on defined ranges, the classification may be based on determined signal trends such as 'decreasing', 'constant', 'increasing'. The term 'constant' shall be understood broadly, and refers e.g. to values that are in a typical range of values for normal operation conditions.

The mapping tool may be adapted to classify time series of sampled signal points into time series of signal states. The available alarm and signal information coming from the distributed control system (DCS) and control diagnostics packages may be classified into characteristic states of Bayesian (or Neuro-fuzzy) network nodes. For example, data time series of distributed control system (DCS) signal sampling points may be mapped to data time series of signal states by means of the classifying arrangements that are based on the neural networks. This enables inclusion of process signals in the diagnostic system.

The alarm information may be treated as binary time series. For example, treatment of the alarms as a binary time series of zeroes (0=no alarm) and ones (1=alarm) allows use of time series as a direct input into the Bayesian Inference block 33. This is so since the inputs can be fairly easily be classified into two states: 0 and 1.

A neural network such as neuro and/or neuro-fuzzy networks may also be trained to classify the latest time history of the signal into information signal states combining signal levels and trends. The input layer may contain a fixed number of sampling points of the signal time history up to current time: $S\_t_{-n} \ldots S\_t_0$. The output layer of the neural network may contain signal states that have been obtained as a combination of different signal levels.

Other possible classification tools may be implemented e.g. by means of a principal component analysis (PCA) or artificial intelligence (AI) agents. The artificial intelligence (AI) agents are typically small C-language programs that may be specially designed for classification purposes.

Additional information may be used to provide decisions e.g. regarding values that are close to the borders of a class, regarding values from specific information sources or with exceptional values and so on.

The classification may also be made adaptive. An example of a system wherein adaptive classification and reasoning under uncertainties may be advantageously used is the case where a certain distributed control system (DCS) signal can have several normal set points with different absolute values. Due to the different set points the classifier has different possibilities to classify (in absolute values) the signals into low, normal or high signal level. Thus it may be advantageous to adapt the classification into high, normal or low signal levels in accordance with the used set points.

The adaptive classification scheme may also allow more flexible treatment of signal trends e.g. into the above referenced trend classes 'constant', 'increasing' or 'decreasing'. Thus, a double classification of signals into levels and trends can be provided. This in its turn can be used for provision of indication of normal or abnormal process conditions. The adaptive classification may allow identification of both signal levels and signal trends as related to changes from normal set points of the process parameters.

Without being limited to these, the above referred neural networks, AI-agents, and/or Principal Component Analysis (PCA) may be employed (either in combination or alone) to add the adaptive character into the classification tool.

Since not all alarm signals of a distributed control system (DCS) are true alarms the system can be adapted to learn to distinguish between true and false alarms. This may be accomplished based on extra parameters related to the alarm states. Examples of the extra parameters include variables that are known to have physical relations with the DCS alarms such as "too high pressure" or alarms indicative of flow rates, tank levels, pumping effects and so on. Other DCS alarms may also be employed here. The alarm signals may be classified into real and false alarms in block 27 of FIG. 2.

The classification into the different states enables the system to more readily handle uncertainties. This is so since the normal process conditions are not bound to a certain combination of exact values of process variables but can rather be expressed by the relation of allowed operation limits (classes) of variables. These classes are then indicative of the process conditions and transitions from normal operation conditions to abnormal conditions.

It shall also be appreciated that although FIG. 2 shows two separate classification blocks 26 and 27 only one classification function may be required.

The classified information is then input to an adaptive root cause analysis block 25. The analysis block 25 is shown to employ three different analysis functions 33 to 35. More particularly, in subblock 33 the analysis is based on the Bayesian Inference models. In block 34 the analysis is based on the Neuro-Fuzzy Inference models. In block 35 the analysis is based on the so called case based reasoning.

Each of the three root cause analysis blocks 33 to 35 is capable of processing the preprocessed information in a reasoned manner under uncertainties in the process. The analysis may be based on execution of one or more of these methods. If more than one reasoning method is executed during the analysis, this may be accomplished in vertical and horizontal plant level for fault detection and isolation of failure origins i.e. the root causes. Such hybrid execution of the reasoning blocks 33 to 35 will be explained in more detail later with reference to FIG. 5.

The skilled person is familiar with the principles of Bayesian networks. A Bayesian network is typically built of discrete and continuous decision nodes. The nodes are typically connected by causality links. The input for the discrete nodes is classified into states. The input in the continuous decision nodes can be any type of random variable distribution. For example, Gaussian distribution or superposition of several Gaussian distributions may be used to approximate any other continuous distribution. The conditional probability table assigned to each node with respect to its parents provides information on the relation between the variables and allows probabilistic reasoning under uncertainties. The chain causality built in the structure of the Bayesian network allows identification of the possible root causes of a failure.

The skilled person is also familiar with the principles of the neuro-fuzzy networks. A neuro-fuzzy network typically consists of fuzzified inputs and/or outputs. The fuzzification for each variable expresses the membership grade of the variable in a certain class of process conditions. Due to the overlap between fuzzy sets (membership functions) the network provides a natural framework for treating transition phenomena between different process conditions and reasoning under uncertainties. The network outputs can be ranked after membership grade to indicate the most likely failure cause.

The case based reasoning may provide a substantially quick processing of digital signals. In the case based reasoning a library of cases can be searched in order to locate an event with a similar history. The event may comprise any deviation from specified and/or normal operation conditions of the process. Events (e.g. abnormalities and/or failures) may be described by a number of effects which are acquired in the form of measured and/or computed and/or otherwise observed variables. The case based reasoning may access a database containing a library of cases similar to the observed event, established root causes for the event and required control or maintenance actions.

The case based reasoning may be used in two different context in the analysis. The case based reasoning may be used for event detection (including the detection of the effects of the event) before estimation of the root cause for the event. Two most similar match of e.g. an abnormality/failure case (including its effects) may be chosen based on a distance function with the smallest error measure of similarity estimation. Thus the most similar match may be used to locate the most similar root cause of an abnormality or failure. In the computations each event may be represented by data strings relating to events of similar kind and their effects (expressed as measured, and/or computed, and/or observed variables) with their corresponding root causes (known from historical data).

The case based reasoning techniques can also be used to choose the most similar match of an estimated root cause based on a distance function with the smallest error measure of similarity estimation. That is, the most suitable control (alternatively maintenance) action to correct the root cause of e.g. a detected failure or abnormality may be selected based on the most similar match. As above, data strings relating the estimated root cause (described by measured, and/or computed, and/or observed variables) with a suitable control action or suitable maintenance action may be processed during the computations.

An effective root cause analysis shall preferably focus upon the entire causal system rather than focusing on one or only few features associated with a process. Utilisation of information from a substantial number of information sources and associated with a substantial number of variables will enable a more accurate analysis and clearer understanding of the possible causes of e.g. process failures than information from only a limited number of sources and regarding only a limited number of variables.

Features of an effective analysis system may also include management functions and functions for distinction between real and false process alarms, functions for trend prediction of process variables development with time, functions for failure-cause prediction, functions for prediction of the consequences of the intended control action and so on.

To provide dynamic predictive process diagnostics, a function referred to herein as prediction of the signal development or signal "trend" over time may also be provided in the preprocessing stage 20. Thus a prediction block 32 is shown to be located before the signal classification stage 26, 27. Short and long term predictions allow control and maintenance actions to be taken at the earliest stage of failure development. This makes it possible to achieve low cost control actions or minimal losses and process breakdowns due to maintenance activities.

It shall be appreciated that the prediction and classification operations can be performed simultaneously or in a partially limited fashion.

Initial preprocessing of at least some of the information signals may be provided by block 31. Block 31 may provide database information for use in the prediction and/or classification of the distributed control system data (DCS) at the subsequent stages 32 and 26, 27. Data stored in the database may be simulated data and/or computed data. The data may also include distribution of continuous variables.

Procedures such as normalisation of signals and comparison to model computations may be accomplished prior to the classification stage. These data sets may then be used for learning and tuning of the network structure, together with the qualitative knowledge/experience data. The operator feedback to the system on probable root causes may be employed to add adaptive learning functionality and to improve the system performance (see FIG. 4).

Systematic approaches may also be used in the analysis. In this context a reference can be made to FIG. 4. The systematic or structured approaches may be based on use of one or more models that describe the process. The models may be adapted to describe features or characteristics of the process and its underlying physics that cannot be directly extracted from the process e.g. by measuring a parameter. The models may be used to describe features such as process performance, time trends, equipment information status and so on. The structured knowledge may be based on mathematical process models and/or physical models and/or statistical models and/or operator and/or maintenance personal experience of the process. The structured knowledge may be learned and represented by a Bayesian network for diagnostics of equipment units and a network of Bayesian networks for diagnostics at higher vertical hierarchy levels, like pressure-flow network, process section, group, entire plant and so on.

For example, the statistical modelling methods may be used for providing information on signals (e.g. variance, mean) and signal trends. Probability distribution of random variables may be used to deal with the uncertainties associated with the process.

Models describing the process can be used to provide expertise/knowledge base and/or extract relation between variables describing the process under diagnostics. For example, physical models may be used to produce simulated data to complement historical data acquired from the real plant. This may be advantageous since the historical data may not include all possible failures. This may be especially the case with failures which occur very seldom.

Mathematical models of the process control may be used for the short term predictions. Mathematical models may also be used to include e.g. time delays or for provision of information on needed control actions with respect to the established root causes of a failure.

The information signals may be processed by block 31 so that a trend of values computed is compared to the DCS readings and both absolute deviation divided by an average value and a relative variance are computed to obtain an input for the root cause analysis. Dynamic data reconciliation may be used at block 31 to ensure data consistency with the signals development in time, based on simple physics models, like mass (material) balance, energy balance, and/or thermal balance and so on.

The initial processing stage may combine several different techniques.

Operation and maintenance instructions may be used to provide the rule/knowledge base for the diagnostics. Maintenance information may be used for the long term predictions. Equipment data may be used for short/long term predictions.

Data about the process may be stored in a database 24 (see FIGS. 3 and 4). The data such as historical data may be updated over time. The update may be accomplished such that only such historical data or other data that is within a predefined time window from the present moment of time is stored and/or used in the preprocessing of the alarm signal. The update may be accomplished in real time such that the window moves continuously forwards as the time goes by.

A number of lower level diagnostics packages, physics models, mathematics models of process control, maintenance and equipment data may provide the database 24 with information on process history and its real-time update. The historic data can be used both in the prediction and classification stages to the system. The quality of the statistic data regarding process failures may be improved by build-up of a database of failure cases. This type of operation can be employed e.g. in structure learning and tuning of the Bayesian network.

A control system employing reasoning under one or more uncertainties can be adapted to learn from previous events. This may be based on use of the data time series. The classification enables tuning of the structured domain knowledge by domain data based on data about the events. Operators may also provide feedback to the system and thus enable adaptive learning. Thus, a more objective knowledge structure can be established as a reasoning basis in the analysis system.

Correlation between different signals and functions can be incorporated into the system by comparing the models describing the process and/or process physics to measured values. That is, beforehand computed values may be compared to values measured from the process in order to detect any unexpected operation. This may be accomplished in the initial processing stage of the diagnostic.

The comparing of the two sets of data may allow the system to take into account developments over time i.e. trends in the process. By taking the variance of this the system may directly get a statistical measure. The statistical measure may then be used to group faults into different categories, such as: severe; urgent action needed/not needed; a fault starting to develop; and so on. Ratios between measures may also be incorporated for e.g. serial or parallel flows in order to normalise the measurements.

If the process conditions are changed it is possible to use factors that reflect the belief of the model that should be used for describing the changed process conditions.

Figure 6:
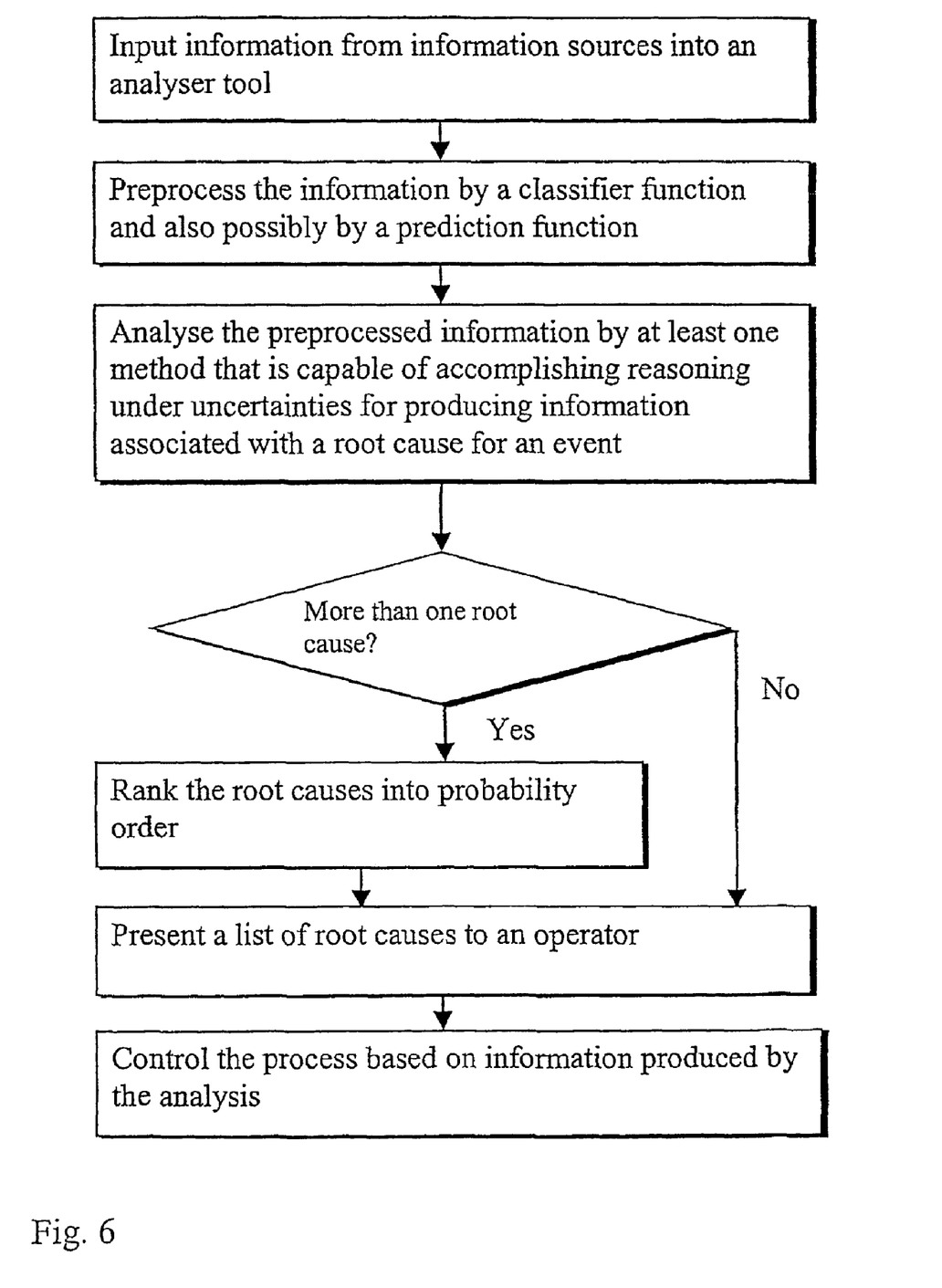
FIG. 6 is a flowchart illustrating the operation of one embodiment of the present invention.

As shown by the flowchart FIG. 6, the results of the root cause analysis may be ranked into an order prior displaying them to an operator. The ranking may be accomplished e.g. by the advice and alarm generator 40 of FIG. 4. The established root causes may be ranked based on probabilities (in the Bayesian inference), based on the degree of membership (in the neuro-fuzzy inference) and based on the minimal error of similarity (in the case base reasoning). The ranked root causes may then be presented as a list to the operator or maintenance personal in order to provide quick and efficient decision support. Similar ranking of the required control/maintenance actions may be provided based on the established root causes.

The ranking of root causes after probabilities determination gives a better decision support and more flexibility for the control actions by the operator. Suitable control actions for failure correction may also be ranked after probabilities to provide the operator with more information while deciding on needed control action.

According to an possibility at least two root causes are presented in parallel, that as equally likely. The operator may then compare the results and make a decision based on the displayed results.

Figure 5:
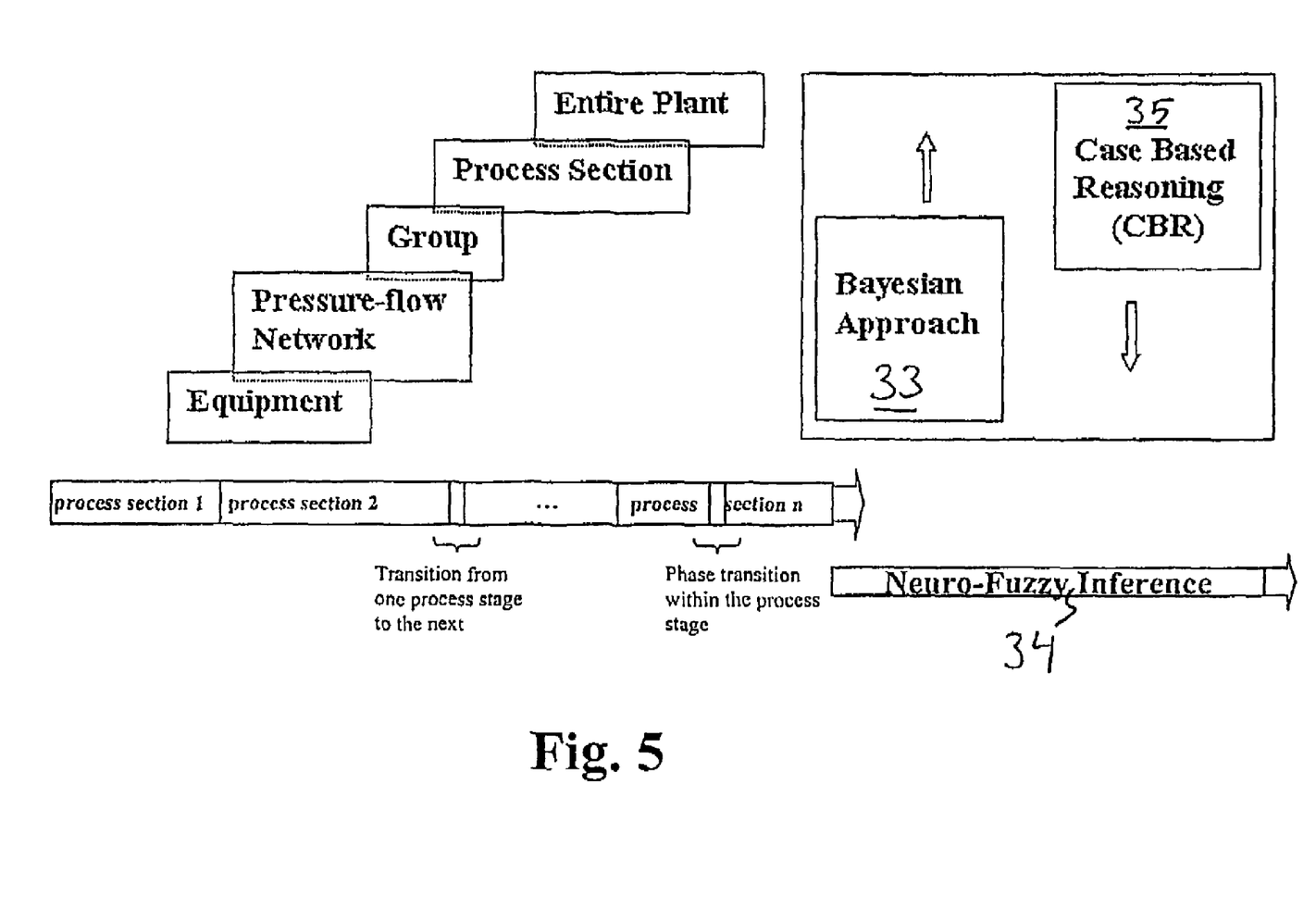
FIG. 5 shows relations between various functions in an hybrid root cause analysis.

Reference is now made to FIG. 5 showing a hybrid analysis in which the three reasoning techniques of FIG. 2 are used for the adaptive root cause analysis (ARCA). The case based reasoning is used for detection occurrence of an event such as abnormality. The case based reasoning may be used for detection of abnormalities or failures in a direction from the top plant level down to process sections and groups of equipment. That is, the case based reasoning may identify events in the following order: entire plant→process section→group→pressure-flow network→equipment.

The case based reasoning may receive data strings based on the DCS signals associated with the process. The DCS data may be completed in the preprocessing stage by appropriate indices. The analysis may also receive manual inputs e.g. for information that is difficult to measure. The case based reasoning may then search the failure library to identify data strings that indicate the most similar failure or build-up to a failure.

The Bayesian inference based searching is then used for more precise determination of the root cause that is behind the failure or abnormality detected by the case based reasoning. The Bayesian approach search for the root cause is preferably accomplished in the opposite direction, that is from the equipment unit level up to the process section level. The Bayesian approach functions to isolate the root cause. Its hierarchy may be arranged such that a single Bayesian network is used for diagnosing components or equipment units while the Bayesian network for diagnosing the entire plant comprises several groups of Bayesian networks.

A plant may be considered to consist of a series of process sections or stages. The adaptive root case analysis in the plant level incorporates Neuro-Fuzzy Inference for handling uncertainties in process transitions between the consequent process sections or stages or phase transitions of a multi-phase process. This searching is accomplished in the horizontal direction in FIG. 5.

In other words, the adaptive root cause analysis may be implemented as a hybrid of approaches such as vertical top-down plant hierarchy by case based reasoning for fault detection, vertical down-up plant hierarchy by Bayesian inference for root cause isolation, and on horizontal plant level by neuro-fuzzy inference for analysing process or phase transitions. The hybrid arrangement may improve the reliability of the root cause analysis since the hybrid arrangement provides double check functionality. In addition, an abnormality or development of an abnormality may be detected quicker by the case based reasoning than e.g. by the Bayesian approach while the Bayesian approach gives a better idea of the root cause.

The above described system will provide an automatic "soft sensor" for fault/abnormality indication at a level that is more advanced than the alarms of a distributed control system (DCS). The classification stage simplifies the various information variables to be input into the analyzer function.

The signal states of the process parameters, classified as described above, can also be used for structure learning of failure trees by means of Bayesian Inference to establish parameter relations and chain causality.

There is no explicit limitation on the number of variables and their states the proposed approach is capable of handling. However, the computation of the algorithms may take longer time if a substantially large number of variables and/or states is used as these may require longer reasoning time and thus the number of states is preferably as low as possible.

The analysis is preferably performed by a computerised system. Part of the analysis, however, can also be done manually. An operator may e.g. manually input feedback to the system by clicking on interface checkboxes.

On-line process observations may be used for updating the conditional probabilities for each individual equipment or process section. Thus, individual diagnostics such as the root cause analysis will be possible for a particular equipment unit. The individual diagnostic may take benefit from a common failure database. The diagnostic system is adaptive to varying process conditions. The system may reason and make decisions under uncertainties.

The diagnostics may be dynamic and forecasting in its character due to the possibility for short and long term prediction of signal development with time. The short term predictions may allow to plan and optimise control actions. The long term predictions may allow better maintenance planning, including order of spare parts and their delivery just on time, avoiding both big storage of spares and expensive process breakdowns due to delayed maintenance.

Off-line tuning of causality in parameter relations can be done both automatically based on input data and manually by an expert. Then, the Bayesian network (or the entire plant Bayesian network consisting of a number of lower hierarchy level Bayesian networks) may perform on-line inference (adaptive root cause analysis), using input data from the prognostic classifier.

Figure 7:
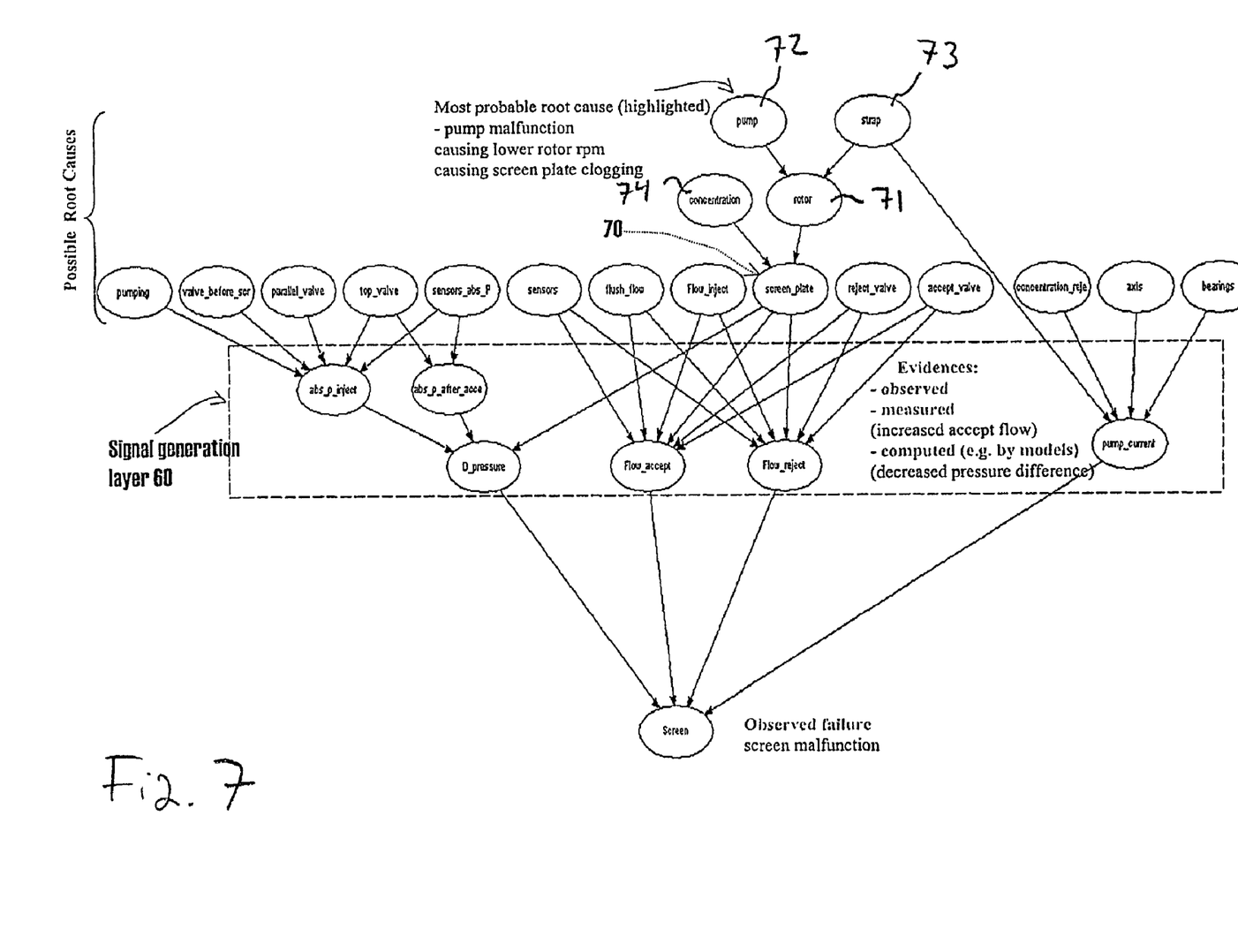
FIG. 7 is an example of a chain causality network.

The herein discussed system can be used, for example, for providing a decision support tool to the operator by ranking causes and control actions. The system may be adapted to generate advice with predictive adaptive handling of process alarms and events. An example of the fault diagnostic is described below with reference to FIG. 7 showing a chain causality network in a screen malfunction situation.

An operator may read process related information from a monitor means, such as the display of the operator station 10 of FIG. 1. A graphical display may be provided based on the information signals generated on a information generation layer 60. The most probable cause of the detected event may be highlighted visually.

After propagating information of evidences (e.g. increased pressure difference and decreased accept flow), a Bayesian Inference engine may conclude that most probably the screen malfunctioning is caused by clogging of a screen plate 70. There might be several reasons for the plate to clog, such as too high concentration of fluid (74) or malfunctioning of a rotor 71 operating the screen plate 70. The malfunction of the screen plate 70 may also influence several different information signals generated on the layer 60. Therefore the operator may not be able to determine the fault or faults causing the malfunction as he may not be able to determine the root cause of the situation solely based on the layer 60 information. It may even be that due to the overflow of information from various sources the operator may not even have realised that the fault associates with the screening function or the operator may not have even realised that there is a problem.

Based on the conditional probabilities modelled by cause-effect relations of the Bayesian network, the Bayesian inference engine is capable of concluding that the plate clogging is caused by too low revolutions per minute of the rotor 71, which in its turn is caused by a malfunctioning pump 72 (and not e.g. by a skidded strap 73).

It may be more cost effective to replace the pump rather than repair it, especially if variables such as production lost due to a stop in the process for the repair is taken into account. Thus, as a result of the analysis and information associated with the cost, the most suitable control action to be displayed to the operator will then be "replace the malfunctioning pump with a new one".

The above discussed analysing arrangement provides a tool for the operator to obtain information from the real root cause or root causes without requiring the operator to follow each causality chain up to the component level in order to find the root cause. Instead of this, the embodiments analyse information of evidences produced by the signal generation layer 60. The evidence information may be collected by measurements, observations and/or computations that are based on process models (physical, mathematical and/or statistical models). The amount of variable states input to the analyser is reduced by classifying the information into characteristics states. The uncertainties caused e.g. by information signals from other sources not associated with the malfunction are taken into account by the reasoning function. After receiving and propagating the evidences the Bayesian Inference engine may compute the probabilities of possible root causes.

The produced root cause information may be ranked after probabilities and presented to the operator on a Graphical User Interface, such as the display means of the computer 10 of FIG. 1. Explanation of the underlying cause-effect relations may be shown to the user while a certain root cause is elected from the ranking list. The explanation may be presented in the form of Bayesian graph where the most probable chain of causality is highlighted.

Alarm signals may be classified into root cause alarms and effect alarms. Only root cause alarms may be displayed to the operator.

The arrangement may also be such that the display means show an updated analysis after the operator has given feedback to the initial advice by the analysing system.

A part of the analysis may be carried out by one or more data processor facilities that are positioned in a remote location at least one part of the process. A communication media may be provided between the processor facility and the process e.g. by means of a data network. Messages generated by the advice generator 40 of FIG. 4 may also be communicated via a data network such as an Internet Protocol based network or local area network (LAN). The communication media may also comprise a wireless communication network, for example a second generation (2G) or a third generation (3G) communication system or a wireless local network, for example a wireless short range link based on the Bluetooth™ protocol.

The analyser arrangement may be linked with a spare parts and/or components supply system and similar maintenance databases. Information from the at least one database for storing information associated with components, spare parts and similar can be used when generating an advice. For example, it can be determined that the most appropriate action cannot be taken since there is no spare component available, the operator may be instructed to take the next best action.

The embodiments of the present invention facilitate input of alarm and other information signals directly as inputs to the root cause analysis layer. An abnormality such as a fault can be detected long before the occurrence of a real problem and a warning alarm may be given for the operator in time before any actual problems. The analysis can be used to reduce the sometimes enormous amount of available process information and the provide the operator only with the necessary root cause information.

It shall be appreciated that the produced information may concern the process as such or any component, equipment or similar that associates with the process. Information may also be produced that concerns the product obtained by the product.

It is noted herein that while the above describes exemplifying embodiments of the invention, there are several variations and modifications which may be made to the disclosed solution without departing from the scope of the present invention as defined in the appended claims.

The invention claimed is:

1. A method of producing information associated with a process, the method comprising:
    receiving information, including time series of sampled signal points, from sources in association with the process;
    determining a trend based on said received information;
    classifying said information into characteristic states based on the determined trend, the classifying including classifying alarm signals between real states and false states;
    mapping said time series of sampled signal points into time series of signal states based on said classification; and
    analyzing said time series of signal states for producing information associated with a root cause for an event by means of at least one analyzing technology that is capable of reasoning under at least one uncertainty.

2. The method according to claim 1, wherein the event comprises an abnormal condition.

3. The method according to claim 2, wherein the event comprises a failure.

4. The method according to claim 1, wherein the classification reduces the number of variable states that are input into the analyzing stage.

5. The method according to claim 1, wherein information comprising numeric variables is classified into characteristic states based on the value of the variables.

6. The method according to claim 5, wherein a value is classified into a characteristic state that defines a range of values said value belongs to.

7. The method according to claim 1, wherein at least one characteristic state is expressed by means of a binary value.

8. The method according to claim 7, wherein information input into the analyzing stage comprises a string of binary values.

9. The method according to claim 1, wherein information input into the analyzing stage comprises a continuous distribution of variables.

10. The method according to claim 1, wherein at least one characteristic state indicates a condition.

11. The method according to claim 1, wherein alarm signals are classified into root cause alarms and effect alarms, and only root cause alarms are presented to a user.

12. The method according to claim 1, wherein said processing further comprises predicting development and/or trend of an information signal.

13. The method according to claim 1, wherein information from information sources is processed adaptively.

14. The method according to claim 1, further comprising: use of structured information associated with the process.

15. The method according to claim 14, wherein at least a part of the structured information is acquired by means of lower level diagnostic packages.

16. The method according to claim 14, wherein said structured information comprises at least one model describing the process.

17. The method according to claim 16, wherein a model describes physics of the process.

18. The method according to claim 16, wherein a model describes mathematical characteristics of the process.

19. The method according to claim 16, wherein a model is based on statistical information or experience from the process.

20. The method according to claim 1, further comprising:
    training of the information processing stage based on information about at least one trend or development determined for the process.

21. The method according to claim 1, further comprising:
    use of at least one neural network for said processing of information prior the results of said processing are input into the analyzing stage.

22. The method according to claim 21, wherein at least one neuro-fuzzy network is used.

23. The method according to claim 1, further comprising:
    use of principal component analysis and/or artificial intelligence agents.

24. The method according to claim 1, wherein said capability to reason under at least one uncertainty is provided by adaptive root cause analysis.

25. The method according to claim 24, wherein a hybrid combination of at least two different adaptive root cause analysis methods is used for the reasoning under at least one uncertainty.

26. The method according to claim 24, wherein the adaptive root cause analysis is provided by means of at least one of the following methods: Bayesian inference; neuro-fuzzy inference; case based reasoning.

27. The method according to claim 26, wherein the cased based reasoning is for identifying an abnormality, the Bayesian inference is for determination of at least one root cause behind the abnormality, and the neuro-fuzzy inference is for analyzing abnormalities between stages and/or phase transitions in the process.

28. The method according to claim 1, further comprising:
comparing of simulated or computed data with data obtained from the process.

29. The method according to claim 28, further comprising:
trending a deviation determined by said comparing.

30. The method according to claim 1, further comprising:
normalization of information on which the analysis is to be based on.

31. The method according to claim 1, further comprising:
testing for fault and/or abnormality patterns after said classification.

32. The method according to claim 1, further comprising:
monitoring for development of a root cause for an event.

33. The method according to claim 1, wherein at least a part of the information for the analysis is provided by a distributed control system.

34. The method according to claim 1, wherein the output of the analyzing stage is used in real-time control of the process.

35. The method according to claim 1, further comprising:
prediction of required actions based on the output of the analyzing stage.

36. The method according to claim 34, wherein control actions are ranked based on at least one of the following list: probabilities; membership grade; minimal error measure of similarity.

37. The method according to claim 1, wherein information associated with a plurality of root causes is produced, and said root causes are ranked based on the probabilities thereof.

38. The method according to claim 1, wherein a part of the analysis is carried out by a data processing facility in a location which is remote with respect to the physical location of at least one part of the process.

39. The method according to claim 1, wherein an operator may input feedback after presentation of the results of the analysis, and updated results are provided based on the feedback.

40. The method according to claim 1, wherein the characteristic states comprise decreasing, constant, or increasing.

41. An analyzer for analyzing a process, the analyzer comprising:
processing means adapted to receive information, including time series of sampled signal points, from sources in association with the process, to determine a trend based on said received information, to classify said information into characteristic states based on the determined trend, including classifying alarm signals between real states and false states, and to map said time series of sampled signal points into time series of signal states based on said classification; and
analyzing means for classifying information associated with the process into characteristic states and analyzer means for producing information associated with a root cause of an event by means of at least one analyzing technology that is capable of reasoning under at least one uncertainty.

42. The method according to claim 41, further comprising:
prediction means for predicting development and/or trend of an information signal.

43. The method according to claim 41, wherein the processing means and/or the prediction means are implemented by means of at least one neural network.

44. The method according to claim 43, further comprising:
at least one neuro-fuzzy network.

45. The method according to claim 41, further comprising:
a storage means for storing structured information associated with the process.

46. The method according to claim 45, wherein the structured information comprises at least one model describing the process and/or the physics of the process.

47. The method according to claim 41, wherein the analyzer means comprises means for implementing adaptive root cause analysis.

48. The method according to claim 47, wherein the analyzer means comprises means for hybrid implementation of at least two different root cause analysis methods.

49. The method according to claim 41, further comprising:
a graphical user interface.

50. The analyzer according to claim 41, further comprising:
means for communicating a message to a remote operator, said means being based on a communication media that is based on use of Internet protocol and/or a wireless communication protocol.

51. The analyzer according to claim 41, further comprising:
at least one database for storing information associated with components, spare parts and similar, and an association between the analyzer and said at least one database.

52. The analyzer according to claim 41, wherein the characteristic states comprise decreasing, constant, or increasing.

53. A computer program product, comprising:
a computer readable medium; and
program code means recorded on the computer readable medium and executable by a processor for performing any of steps of
receiving information, including time series of sampled signal points, from sources in association with the process;
determining a trend based on said received information;
classifying said information into characteristic states based on the determined trend, the classifying including classifying alarm signals between real states and false states;
mapping said time series of sampled signal points into time series of signal states based on said classification; and
analyzing said time series of signal states for producing information associated with a root cause for an event by means of at least one analyzing technology that is capable of reasoning under at least one uncertainty.

* * * * *